April 26, 1927.　　　　M. FALK　　　　1,626,334

KEY CHAIN

Filed May 29, 1926

Inventor
Morris Falk
By Attorneys
Southgate Fay & Hanley.

Patented Apr. 26, 1927.

1,626,334

UNITED STATES PATENT OFFICE.

MORRIS FALK, OF FITCHBURG, MASSACHUSETTS, ASSIGNOR TO INDEPENDENT LOCK COMPANY, OF FITCHBURG, MASSACHUSETTS, A CORPORATION OF MASSACHUSETTS.

KEY CHAIN.

Application filed May 29, 1926. Serial No. 112,669.

This invention relates to a key chain of the type in which the chain is divided into two loops for separating certain keys from others and yet keeping them on the same chain.

The principal object of the invention is to provide an improved slide for dividing the chain which will not necessitate the chains crossing each other and thereby putting an extra strain on them.

Another object of the invention is to provide this device in a simple and inexpensive construction.

Reference is to be had to the accompanying drawings in which—

Figure 1:
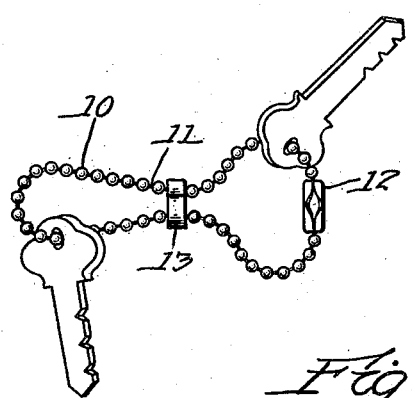
Figure 2:
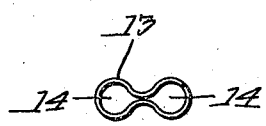

Fig. 1 is a side view of a key chain showing its use and showing this invention applied thereto; and Fig. 2 is an edge view of the slide itself.

I have shown the invention as employing an ordinary chain made up of a series of balls 10 and links 11 between them. I have also shown the chain connected at the two ends by a detachable link 12 as usual.

The novelty consists in the provision of a slide 13 of sheet metal, shown more specifically in Fig. 2 and having two passages 14 just large enough for the balls 10 to slide through them easily. The slide is formed of a strip of sheet metal. The two cylindrical parts furnishing said passages are integrally connected at the center by parts which are in contact or nearly so.

In use, as will be seen clearly from Fig. 1, the slide is placed in any convenient place to divide the chain into two parts, each serving as a separate chain for keys.

This slide is of a very simple nature and inexpensive to make and apply. It cannot slip off the chain in any way and keeps the strands of the chain parallel with each other and spaced apart a little at the point at which the slide is located. It holds the links at that point so that the strands are not likely to get tangled up. Otherwise the chain has the usual advantages of chains of this type.

Although I have illustrated and described only a single form of the invention I am aware of the fact that modifications can be made therein by any person skilled in the art without departing from the scope of the invention as expressed in the claim.

What I claim is:—

As an article of manufacture, a key chain having a separate device for dividing the chain into two parts, consisting of a piece of sheet metal bent into two hollow cylindrical portions, each having a passage therethrough for receiving the chain and allowing it to move freely therein and the two sides of the slide being bent inwardly toward each other substantially in contact between the two strands of the chain.

In testimony whereof I have hereunto affixed my signature.

MORRIS FALK.